(12) United States Patent
Wang et al.

(10) Patent No.: US 12,400,631 B2
(45) Date of Patent: Aug. 26, 2025

(54) METHOD, ELECTRONIC DEVICE, AND COMPUTER PROGRAM PRODUCT FOR GENERATING CROSS-MODALITY ENCODER

(71) Applicant: Dell Products L.P., Round Rock, TX (US)

(72) Inventors: Zijia Wang, Weifang (CN); Jiacheng Ni, Shanghai (CN); Jinpeng Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 18/327,625

(22) Filed: Jun. 1, 2023

(65) Prior Publication Data
US 2024/0371358 A1 Nov. 7, 2024

(30) Foreign Application Priority Data
May 6, 2023 (CN) .......................... 202310506665.9

(51) Int. Cl.
*G10L 13/08* (2013.01)
*G10L 13/04* (2013.01)

(52) U.S. Cl.
CPC .............. *G10L 13/04* (2013.01); *G10L 13/08* (2013.01)

(58) Field of Classification Search
CPC ... G10L 13/08; G10L 13/0335; G10L 13/033; G10L 2021/0135; G10L 25/63;
(Continued)

(56) References Cited

U.S. PATENT DOCUMENTS

| | | | |
|---|---|---|---|
| 8,861,689 B1 * | 10/2014 | Typrin | H04M 19/04 704/203 |
| 2017/0262718 A1 * | 9/2017 | Noma | G06V 30/242 |

(Continued)

OTHER PUBLICATIONS

G. Gafni et al., "Dynamic Neural Radiance Fields for Monocular 4D Facial Avatar Reconstruction," IEEE/CVF Conf. on Computer Vision and Pattern Recognition, Jun. 2021, pp. 8649-8658.

(Continued)

*Primary Examiner* — Jakieda R Jackson
(74) *Attorney, Agent, or Firm* — Ryan, Mason & Lewis, LLP

(57) ABSTRACT

Embodiments of the present disclosure relate to a method for generating a cross-modality encoder. The method includes: extracting a sample video feature of a sample video, a sample audio feature of a sample audio, and a sample text feature of a sample text, wherein contents of the sample video, the sample audio, and the sample text are associated with each other. The method further includes: generating, by the cross-modality encoder, a first cross-modality sample feature by combining the sample video feature, the sample audio feature, and the sample text feature; generating a scrambled cross-modality sample feature by performing a scrambling operation on the cross-modality feature; generating by the cross-modality encoder a second cross-modality sample feature by encoding the scrambled cross-modality sample feature; and tuning the cross-modality encoder based on the first cross-modality sample feature and the second cross-modality sample feature.

20 Claims, 13 Drawing Sheets

(58) Field of Classification Search
CPC ........ G06N 3/045; G06N 3/08; G06F 16/632; G06F 16/638; G06V 10/82; G06V 20/46
See application file for complete search history.

(56) References Cited

U.S. PATENT DOCUMENTS

| | | | | |
|---|---|---|---|---|
| 2020/0335092 | A1* | 10/2020 | Georgiou | G06F 40/20 |
| 2023/0013777 | A1* | 1/2023 | Jia | G10L 13/10 |
| 2023/0115551 | A1* | 4/2023 | Jin | G06V 10/82 |
| | | | | 382/157 |
| 2023/0134984 | A1* | 5/2023 | Chen | G10L 13/08 |
| | | | | 704/260 |
| 2023/0281456 | A1* | 9/2023 | Dumpala | G06N 3/088 |
| | | | | 706/25 |
| 2024/0004963 | A1* | 1/2024 | Nouri | G06F 18/10 |
| 2024/0013558 | A1* | 1/2024 | Wang | G06F 40/279 |
| 2024/0127788 | A1* | 4/2024 | Hsieh | G10L 13/033 |
| 2024/0220530 | A1* | 7/2024 | Wilkins | G06F 16/433 |
| 2024/0304177 | A1* | 9/2024 | Wu | G06F 40/30 |
| 2024/0362269 | A1* | 10/2024 | Wu | G06F 16/638 |
| 2024/0362422 | A1* | 10/2024 | Callegari | G06F 40/40 |

OTHER PUBLICATIONS

J. Liu et al., "OPT Omni-Perception Pre-Trainer for Cross-Modal Understanding and Generation," arXiv:2107.00249v2, Jul. 6, 2021, 10 pages.

Y. Ren et al., "FastSpeech 2 Fast and High-Quality End-to-End Text to Speech," arXiv:2006.04558v8, Aug. 8, 2022, 15 pages.

Q. Chen et al., "V2C: Visual Voice Cloning," IEEE/CVF Conference on Computer Vision and Pattern Recognition (CVPR), Jun. 2022, pp. 21242-21251.

Y. Ren et al., "FastSpeech: Fast, Robust and Controllable Text to Speech," Proceedings of the 33rd International Conference on Neural Information Processing Systems, Dec. 2019, 10 pages.

A. Suni et al., "Wavelets for Intonation Modeling in HMM Speech Synthesis," ISCA Speech Synthesis Workshop, Aug. 2013, 6 pages.

K. Hirose et al., "Speech Prosody in Speech Synthesis: Modeling and Generation of Prosody for High 1uality and Flexible Speech Synthesis," Springer, 2015, Index Only.

* cited by examiner

METHOD, ELECTRONIC DEVICE, AND COMPUTER PROGRAM PRODUCT FOR GENERATING CROSS-MODALITY ENCODER

RELATED APPLICATION

The present application claims priority to Chinese Patent Application No. 202310506665.9, filed May 6, 2023, and entitled "Method, Electronic Device, and Computer Program Product for Generating Cross-Modality Encoder," which is incorporated by reference herein in its entirety.

FIELD

Embodiments of the present disclosure relate to the field of cross-modality encoding and, more specifically, to a method, an electronic device, and a computer program product for generating a cross-modality encoder.

BACKGROUND

Cross-modality voice cloning techniques are techniques for combining visualization information with voice information, which can combine voice features with those in a video to generate a speech corresponding to the content of the video. Using the cross-modality voice cloning techniques, artificial intelligence algorithms can be used to learn the relationship between a person's voice and facial expressions, thereby enabling a processing model to automatically capture the correlation between the voice and facial expressions.

SUMMARY

Embodiments of the present disclosure relate to a method, an electronic device, and a computer program product for generating a cross-modality encoder.

According to a first aspect of the present disclosure, a method for generating a cross-modality encoder is provided. The method includes: extracting a sample video feature of a sample video, a sample audio feature of a sample audio, and a sample text feature of a sample text, wherein contents of the sample video, the sample audio, and the sample text are associated with each other; and generating, by a cross-modality encoder, a first cross-modality sample feature by combining the sample video feature, the sample audio feature, and the sample text feature; and generating a scrambled cross-modality sample feature by performing a scrambling operation on the sample video feature, the sample audio feature, and the sample text feature; and generating a second cross-modality sample feature by the cross-modality encoder by encoding the scrambled cross-modality sample feature; and tuning the cross-modality encoder based on the first cross-modality sample feature and the second cross-modality sample feature.

According to a second aspect of the present disclosure, an electronic device for generating a cross-modality encoder is provided, comprising at least one processor, and a memory coupled to the at least one processor and having instructions stored thereon, wherein the instructions, when executed by the at least one processor, cause the electronic device to perform actions comprising: extracting a sample video feature of a sample video, a sample audio feature of a sample audio, and a sample text feature of a sample text, wherein contents of the sample video, the sample audio, and the sample text are associated with each other; and generating, by a cross-modality encoder, a first cross-modality sample feature by combining the sample video feature, the sample audio feature, and the sample text feature; and generating a scrambled cross-modality sample feature by performing a scrambling operation on the sample video feature, the sample audio feature, and the sample text feature; and generating a second cross-modality sample feature by the cross-modality encoder by encoding the scrambled cross-modality sample feature; and tuning the cross-modality encoder based on the first cross-modality sample feature and the second cross-modality sample feature.

According to a third aspect of the present disclosure, a computer program product is provided. The computer program product is tangibly stored on a non-transitory computer-readable storage medium and comprises machine-executable instructions, wherein the machine-executable instructions, when executed by a machine, cause the machine to perform steps of the method in the first aspect of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
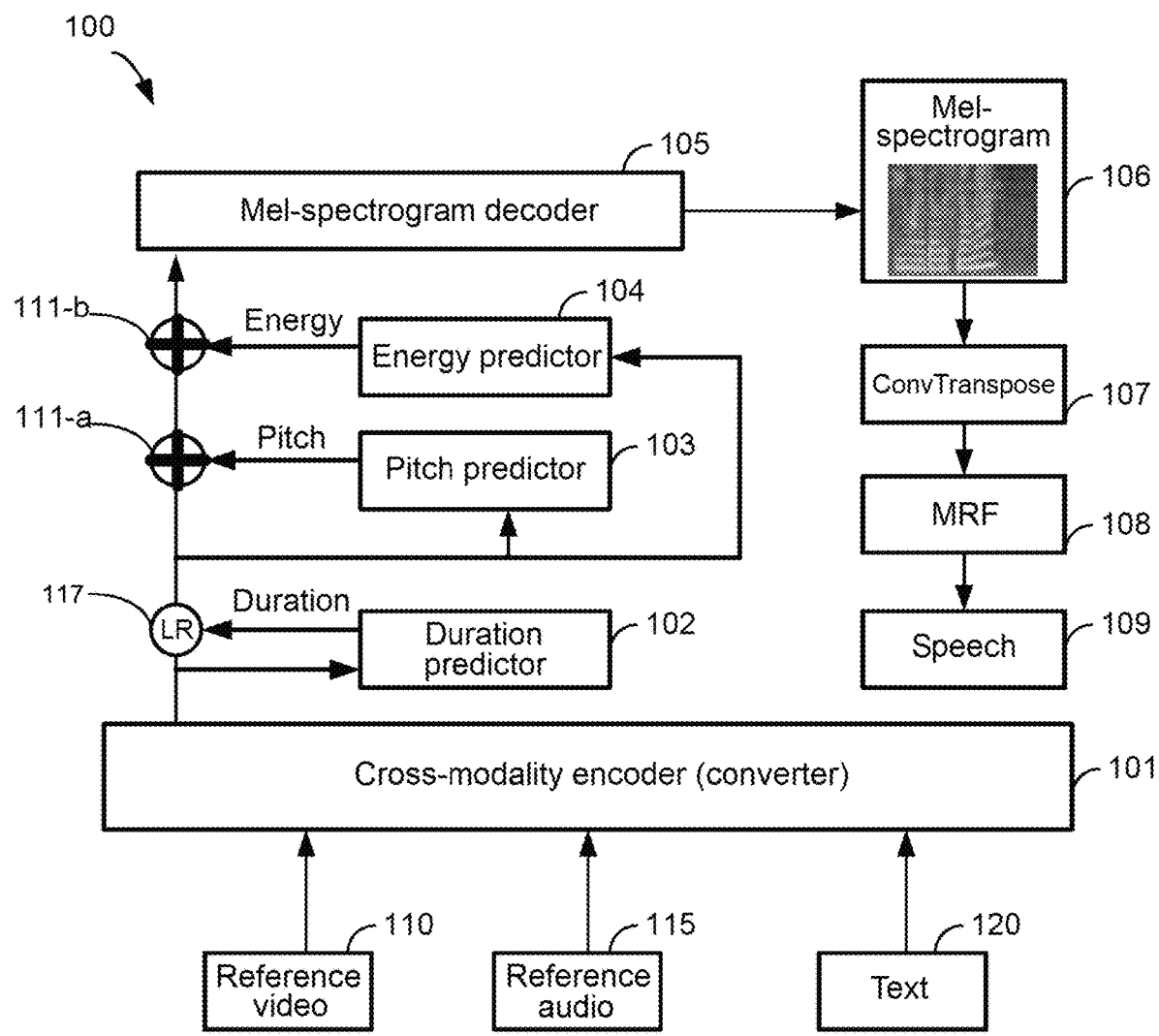
FIG. 1 illustrates an architectural diagram of a video-aided voice cloning system according to embodiments of the present disclosure.

The following will describe embodiments of the present disclosure in more detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Conventional voice cloning (VC) methods cannot address V2C (video to text-to-clip) tasks well because they focus only on how to convert input text to a speech with a voice/tone shown in a reference audio, and they only convert the text to a speech with the help of the reference audio. Existing VC tasks aim at converting paragraph text to a speech using the desired audio specified by a reference audio, without considering the emotion and context contained in the new speech.

At least to address the above and other potential problems, embodiments of the present disclosure provide a method for generating a cross-modality encoder. The method includes: extracting a sample video feature of a sample video, a sample audio feature of a sample audio, and a sample text feature of a sample text, wherein contents of the sample video, the sample audio, and the sample text are associated with each other; and generating, by a cross-modality encoder, a first cross-modality sample feature by combining the sample video feature, the sample audio feature, and the sample text feature; and generating a scrambled cross-modality sample feature by performing a scrambling operation on the sample video feature, the sample audio feature, and the sample text feature; and generating a second cross-modality sample feature by the cross-modality encoder by encoding the scrambled cross-modality sample feature; and tuning the cross-modality encoder based on the first cross-modality sample feature and the second cross-modality sample feature. By using this method, it is possible to convert text into a speech having the desired emotion specified by a reference audio and the desired emotion specified by a reference video, and to take as input a triplet (text/subtitle, reference audio, reference video) and to expect the generated speech to have the same sound, but with a different emotion than the reference video.

Fundamental principles and several example embodiments of the present disclosure will be described in detail below with reference to the accompanying drawings. FIG. 1 illustrates an architectural diagram of a video-aided voice cloning (VaVC) system 100 according to embodiments of the present disclosure. It should be understood that the numbers and arrangement of components, elements, and systems illustrated in FIG. 1 are examples only, and the architectural diagram may include different numbers and different arrangements of components, elements, and systems.

As shown in FIG. 1, the video-aided voice cloning system 100 may include a cross-modality encoder 101, a duration predictor 102, a pitch predictor 103, an energy predictor 104, a mel-spectrogram decoder 105, a transposed convolution (e.g., ConvTranspose) network module 107, a multi-receptive field fusion (MRF) module 108, and a generated speech 109, among other elements and/or components.

The video-aided voice cloning system 100 may generate a desired speech 109 based on a reference video 110, a reference audio 115, and text 120. Specifically, the cross-modality encoder (converter) 101 in the video-aided voice cloning system 100 may encode triplet data $Z=\{Z_{text}, Z_{audio}, Z_{video}\}$ formed by the reference video 110, the reference audio 115, and the text 120 to generate a set of cross-modality data X. The reference video 110 and the reference audio 115 may be used to direct or limit the video-aided voice cloning system 100 to generate a speech associated with its content description and/or context. The text 120 may correspond to the generated speech 109.

For example, in some embodiments, the video-aided voice cloning system 100, after receiving and processing the reference video 110 and the reference audio 115, may ultimately generate the speech 109 having the style, the emotion, the mood, etc., associated with or similar to those contained in the reference video 110 and the reference audio 115. For example, when the contents of the reference video 110 and the reference audio 115 are that a very sad person is speaking, the ultimately generated speech may also have a very sad tone and voice pitch, even if the context of the text 120 corresponding to the generated speech 109 is a scene in which a happy person is giving an award acceptance speech. In some embodiments, when the reference video 110 and the reference audio 115 are that a person is skiing, the generated speech 109 may also include a corresponding sound of sliding through the snow as well as a wind sound. The above examples are for reference only and are not limited in the present disclosure in any way.

The set of cross-modality data X can be represented as $X=\{x_1, \ldots, x_L\}=f(Z)$, where L denotes the length of the input sentences (i.e., the length of the phonemes) in the reference video 110 and the reference audio 115, and $f(\cdot)$ denotes processing by the cross-modality encoder 101. The set of cross-modality data X may include various elements or features from the data of the reference video 110, the reference audio 115, the text 120, etc., such as phoneme features for characterizing the articulation site, articulation method, vocal fold vibration, airflow direction, etc., pitch features for characterizing the fundamental frequency, fundamental period, over-zero rate, timbre, intonation, emotion, etc. of the sound, and volume features and prosody features for characterizing the magnitude, loudness, rhythmicity, melody, time domain distribution, stress, and tone of the speech. It should be understood that the features of the set of cross-modality data X in the present disclosure are for exemplary purposes only and are not intended to limit the scope of protection of the present disclosure.

The set of cross-modality data or conditional phoneme embedding $X=\{x_1, \ldots, x_L\}$ may then be fed to a synthesizer (not shown) in the video-aided voice cloning system 100, and the synthesizer may then process the set of cross-modality data to generate a mel-spectrogram 106 associated with the set of cross-modality data. The mel-spectrogram 106 may include a plurality of mel-spectrogram frames $\mathcal{Y} = \{y_1, \ldots, y_T\}$, where T denotes the number of mel-spectrogram frames. As an example, in the present disclosure, the synthesizer may include the duration predictor 102, the pitch predictor 103, the energy predictor 104, and the mel-spectrogram decoder 105. It should be understood that the elements in the synthesizer in the present disclosure are used for exemplary purposes only and are not intended to limit the scope of protection of the present disclosure. The synthesizer may include any known or unknown elements or components.

In embodiments of the present disclosure, the duration predictor 102 is used to resolve the problem of length mismatch between the set of cross-modality data X and the mel-spectrogram frame $\mathcal{Y}$ (i.e., L≠T). The duration predictor 102, illustratively denoted as $S_d$, may take the set of cross-modality data X as input and predict the duration $\mathcal{D} = \{d_1, \ldots, d_i, \ldots, d_L\} = \{S_d(x_1), \ldots, S_d(x_i) \ldots, S_d(x_L)\}$ of each phoneme feature. The duration $d_i$ of the ith phoneme indicates the number of copies for the ith phoneme feature $x_i$. The length regulator ($\mathcal{LR}$) 117 in the video-aided voice cloning system 100 can then use the predicted duration $\mathcal{D}$ to tune the length of the mel-spectrogram 106 that is to be generated, and the process can be expressed as:

$$X_{mel} = \mathcal{LR}(X, \mathcal{D}) = \mathcal{LR}(X, S_d(X)) \tag{1}$$

where $X_{mel}$ is the expanded phoneme feature with length T.

Data such as the set of cross-modality data X, the predicted duration $\mathcal{D}$, and the expanded phoneme feature $X_{mel}$ can then be fed to the pitch predictor 103, illustratively denoted as $S_p$, for use in generating the predicted pitch contour or pitch spectrum. The pitch spectrum may represent the trajectory of the fundamental frequency change of the sound on the time axis to reflect the contour and variations of the audio melody. The above generated data may also be subsequently fed into the energy predictor 104, illustratively denoted as $S_e$, and the L2 norm of the magnitude of each short-time Fourier transform (STFT) frame in the data is calculated as the predicted energy value to predict the prosody and volume of the generated speech.

The predicted pitch spectrum and the predicted energy value may then be encoded as the predicted pitch spectrum feature and the predicted energy value feature by the feature layers ϕ and φ, respectively. The predicted pitch spectrum feature and the predicted energy value feature can then be added to the expanded phoneme feature $X_{mel}$ through adding operations 111-a and 111-b, and the ultimate mel-spectrogram 106 can be generated by the following equation:

$$y = g(X_{mel} \oplus \phi(S_p(X_{mel})) \oplus \varphi(S_e(X_{mel}))) \tag{2}$$

where g(·) denotes the mel-spectrogram decoder 105, which illustratively comprises 6 fast Fourier transform (FFT) blocks and is used to convert the input feature data into the mel-spectrogram 106.

In some cases, the mel-spectrogram cannot be readily generated with sufficient accuracy, so in some embodiments, the duration predictor 102, the pitch predictor 103, and the energy predictor 104 may also be trained and tuned to optimize the generated mel-spectrogram 106. In some embodiments, in order to optimize the duration predictor 102, the Montreal forced alignment (MFA) method can be used to obtain a ground truth phoneme duration series for the cross-modality training sample data, and then the mean square error (MSE) loss between the predicted phoneme duration series $\mathcal{D}$ generated by the duration predictor 102 and the ground truth phoneme duration series $\hat{\mathcal{D}}$ is calculated. If the MSE loss between the two is below a desired threshold, the duration predictor 102 may be further optimized and trained to minimize the MSE loss. The desired threshold may be set to any value depending on practical needs. The process may be expressed by the following equation:

$$\mathcal{L}_{dur} = \frac{1}{L}\sum_{i=1}^{L}(\hat{d}_i - d_i)^2 \tag{3}$$

In some embodiments, the pitch predictor 103 can also be trained. For example, the continuous wavelet transform (CWT) can be used to convert the continuous pitch of the cross-modality sample data into a pitch spectrogram, compare it as a ground truth pitch spectrum with the pitch values in the predicted pitch spectrum, and calculate the MSE loss between the two. If the MSE loss between the two is below the desired threshold, the pitch predictor 103 may be further optimized and trained to minimize the MSE loss. The desired threshold may be set to any value depending on practical needs. The process may be expressed by the following equation:

$$\mathcal{L}_{pitch} = \frac{1}{T}\sum_{t=1}^{T}(\hat{p}_t - p_t)^2 \tag{4}$$

where $\hat{p}_t$ denotes the t-th ground truth value, and $p_t = S_p(x_t)$ denotes the predicted pitch value.

Similarly as above, the energy predictor 104 can be trained, the energy value of the cross-modality sample data can be compared as the ground truth energy value with the predicted energy value, and the MSE loss between the two can be calculated. If the MSE loss between the two is below the desired threshold, the energy predictor 104 may be further optimized and trained to minimize the MSE loss. The desired threshold may be set to any value depending on practical needs. The process may be expressed by the following equation:

$$\mathcal{L}_{energy} = \frac{1}{T}\sum_{t=1}^{T}(\hat{e}_t - e_t)^2 \tag{5}$$

where $\hat{e}_t$ denotes the t-th ground truth value, and $e_t = S_e(x_t)$ denotes the predicted energy value.

Similarly as above, the mel-spectrogram decoder 105 can also be trained, the mel-spectrogram of the cross-modality sample data can be compared as the ground truth value with the predicted mel-spectrogram generated by the mel-spectrogram decoder, and the mean square loss between the two can be calculated. If the MSE loss between the two is below the desired threshold, the mel-spectrogram decoder 105 may be further optimized and trained to minimize the MSE loss.

The desired threshold may be set to any value depending on practical needs. The process may be expressed by the following equation:

$$\mathcal{L}_{mel} = \frac{1}{T}\sum_{t=1}^{T}\|\hat{y}_t - y_t\| \quad (6)$$

where $\hat{y}_t$ denotes the t-th frame of the ground truth mel-spectrogram, whereas $y_t \in y$ denotes the t-th frame of the predicted mel-spectrogram.

The loss function of the ultimate synthesizer may be expressed by the following equation:

$$\mathcal{L}_S = \mathcal{L}_{mel} + \lambda_1\mathcal{L}_{dur} + \lambda_2\mathcal{L}_{pitch} + \lambda_3\mathcal{L}_{energy} \quad (7)$$

where $\mathcal{L}_{mel}$, $\mathcal{L}_{dur}$, $\mathcal{L}_{pitch}$ and $\mathcal{L}_{energy}$ denote the predicted losses of the mel-spectrogram decoder 105, the duration predictor 102, the pitch predictor 103, and the energy predictor 104 described above, respectively. $\lambda_1$, $\lambda_2$ and $\lambda_3$ are hyperparameters and can be set to $\lambda_1=\lambda_2=\lambda_3=1$ in practical applications. The generated mel-spectrogram 106 is made more accurate by minimizing $\mathcal{L}_S$.

The generated mel-spectrogram 106 can then be fed to a voice encoder (vocoder, not shown) so as to be converted into a time domain waveform map $\mathcal{Y}_{wave}$. In the present disclosure, as an example, the voice encoder may be a HiFi-GAN-based audio processing model, which is primarily concerned with generating original waveforms from the mel-spectrogram by a generative adversarial network (GAN). It exploits periodic patterns in the voice signal to improve sample quality and can perform conditional generation based on acoustic features to achieve speech enhancement of studio quality. It should be understood that the HiFi-GAN-based voice encoder in the present disclosure is used for exemplary purposes only and is not intended to limit the scope of protection of the present disclosure.

The voice encoder may include ConvTranspose network module 107 and multi-receptive field fusion (MRF) module 108. The ConvTranspose network module 107 can first upsample the input mel-spectrogram 106, which can perform an alignment between the length of the output feature and the temporal resolution of the original waveform, and can expand smaller input features into larger output features by using a deconvolutional kernel to perform a convolutional operation on the input features, thereby restoring them to their original size, and control the size of the output features using padding.

The upsampled feature data can then be fed into the MRF module 108, wherein the MRF module 108 contains a plurality of residual blocks, and the sum of the outputs of these residual blocks is used as the ultimate predicted waveform. In the present disclosure, different receptive fields can be ensured by using the setting of residual blocks having different kernel sizes and dilation rates. In the present disclosure, the voice encoder can also be optimized by an objective function containing the LSGAN-based loss, the mel-spectrogram loss, and the feature matching loss. In practical applications, it is also possible to use the "generic" checkpoints provided in the official HiFi-GAN code, without fine-tuning any synthesized mel-spectrogram 106. The speech 109 generated by the above process may have a context such as the voice, the tone, and the emotion associated with the reference video 110 and the reference audio 115 and have a content corresponding to the text 120. It should be understood that the method for generating the speech 109 described above is merely an example and is not intended to limit the scope of the present disclosure. If the reference video 110 is lost, the cross-modality encoder of the present disclosure can naturally encode more emotion-related information and take only text as input, as the modality masking process is in the pre-training stage. The method implemented according to the present disclosure can better implement the data properties of the encoder part, and it can fully capture the connectivity information between different modalities, thus introducing many metrics to make the generation process more robust.

Figure 2:
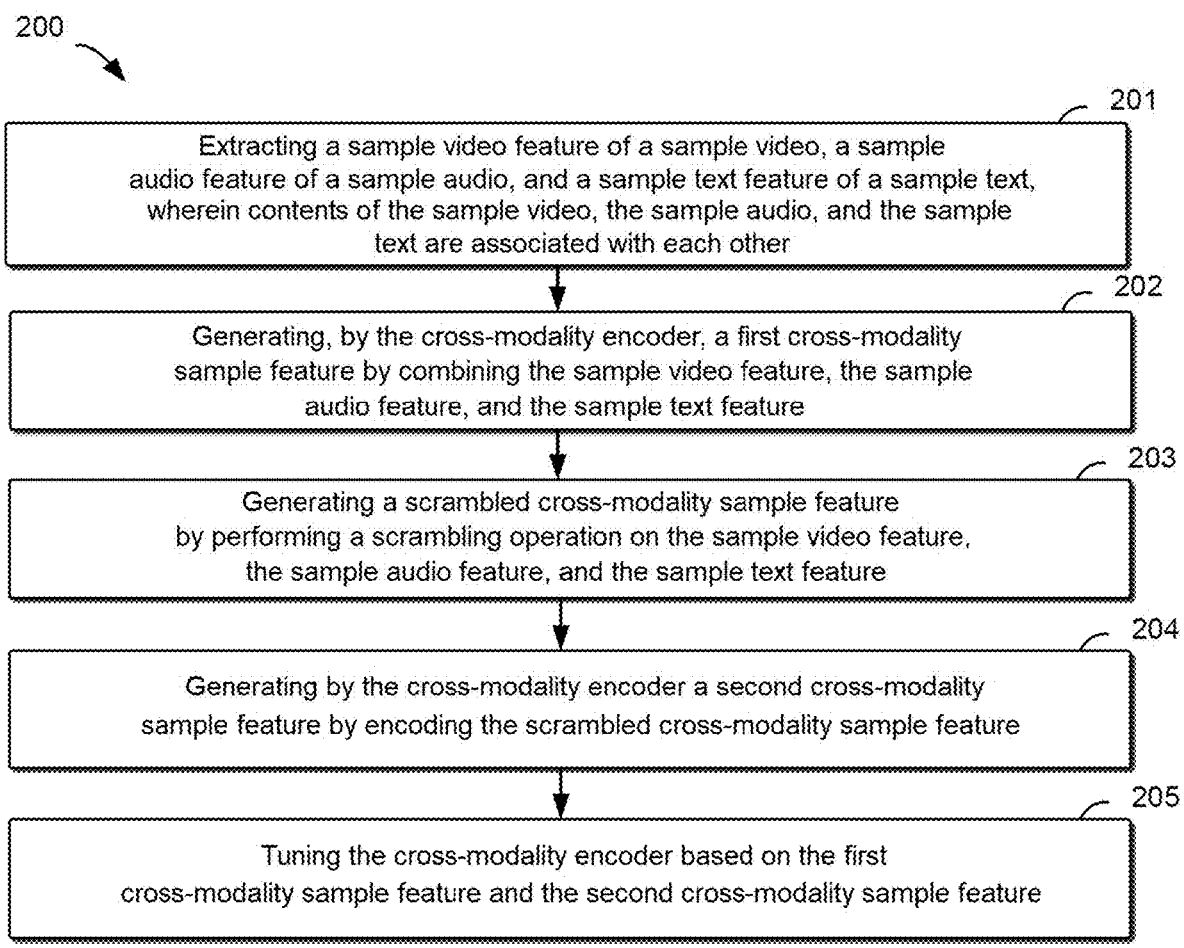
FIG. 2 illustrates a flow chart of a process for generating a cross-modality encoder according to embodiments of the present disclosure.

The method of generation is described above in conjunction with the duration predictor 102, the pitch predictor 103, and the energy predictor 104 of the present disclosure and their associated training processes. However, if the cross-modality encoder 101 cannot be tuned and trained, it may not be possible to generate more accurate speeches. Therefore, the cross-modality encoder is illustratively pre-trained to implement the method described in the present disclosure. The process 200 used to generate the cross-modality encoder will be described below in conjunction with FIG. 2.

At block 201, a sample video feature of a sample video, a sample audio feature of a sample audio, and a sample text feature of a sample text are extracted, wherein contents of the sample video, the sample audio, and the sample text are associated with each other. According to embodiments of the present disclosure, a unimodal encoder such as a video encoder, an audio encoder, and a text encoder may extract the corresponding sample video feature, sample audio feature, and sample text feature for the sample video, sample audio, and sample text corresponding to the same content, respectively. By way of example, in embodiments of the present disclosure, the video encoder may be a Faster R_CNN-based encoder, the audio encoder may be a wave2vec 2.0-based audio encoder, and the text encoder may be a BERT-based text encoder, which are not limited in any way by the present disclosure. The sample to be extracted may be a movie segment containing subtitles, and the video encoder, the audio encoder, and the text encoder encode the video segment, audio segment, and subtitles therein, and extract the corresponding sample video feature, sample audio feature, and sample text feature.

At block 202, a first cross-modality sample feature is generated by a cross-modality encoder by combining the sample video feature, the sample audio feature, and the sample text feature. According to embodiments of the present disclosure, as an example, the cross-modality encoder may be a deep learning model capable of processing information for multiple modalities (e.g., text, image, audio, etc.), which can exploit the correlation between different modalities to improve characterization and generalization capabilities. The cross-modality encoders are used to perform interaction and fusion of features from different modalities. The cross-modality encoder may be adapted to different downstream tasks such as visual Q&A, image retrieval, machine translation, and others by means of pre-training and fine-tuning. The sample video feature, the sample audio feature, and the sample text feature extracted by the unimodal encoders such as the video encoder, the audio encoder, and the text encoder can then be fed to the cross-modality encoder for fusion so as to generate a first (original) cross-modality sample feature. The cross-modality feature includes features extracted from different data modalities (e.g., image, text, audio, etc.) that can express the same or associated semantic information. The cross-modality feature can be used to implement matching, retrieval, generation, etc., between data of different modalities.

At block 203, a scrambled cross-modality sample feature is generated by performing a scrambling operation on the sample video feature, the sample audio feature, and the sample text feature. According to embodiments of the present disclosure, the video-aided voice cloning system may perform scrambling operations on the extracted sample video feature, sample audio feature, and sample text feature, the scrambling operations may include random masking operations and exclusive-or (XOR) operations, and ultimately a scrambled cross-modality sample feature is generated.

The video-aided voice cloning system may divide one or more features of the sample video feature, the sample audio feature, and the sample text feature into a plurality of portions. The random masking operation may include performing inference by randomly masking or covering one or more of these divided portions such that the cross-modality encoder can predict the target output from incomplete information and ultimately improve the generalization capability of the cross-modality encoder.

The XOR operation may include performing random cross-concatenation on the plurality of portions divided from the sample video feature, the sample audio feature, and the sample text feature, so as to form a new concatenated sample feature. For example, a first portion may be selected from the sample video feature, a second portion from the sample audio feature, a third portion from the sample text feature, and these portions may be concatenated together to form a new concatenated sample feature, where the various portions of the new concatenated sample feature are decoupled from each other, which helps the cross-modality encoder learn to better adapt to different input variations. For example, in the context of voice cloning, the target output resulting from the processing of the new concatenated sample feature by the cross-modality encoder may be the result of a mixture of the voices of two speakers. The similarity or distance between features can be calculated by using an XOR operation. Additionally or alternatively, the random masking operation and the XOR operation may be performed simultaneously or sequentially, which is not limited in the present disclosure in any way.

At block 204, a second cross-modality sample feature is generated by the cross-modality encoder by encoding the scrambled cross-modality sample feature. The cross-modality encoder may then encode the scrambled cross-modality sample feature to generate the second (scrambled) modality sample feature, where the components of the second modality sample feature may be decoupled from each other.

At block 205, the cross-modality encoder is tuned based on the first cross-modality sample feature and the second cross-modality sample feature. The cross-modality encoder may compare the first cross-modality sample feature with the second cross-modality sample feature that has been generated. As an example, the cross-modality encoder can compare a Kullback-Leibler (KL) divergence between the first cross-modality sample feature and the second cross-modality sample feature, where the KL divergence can be used to describe the degree of difference between the two features. If the KL divergence between the two is small, it indicates that the first cross-modality sample feature and the second cross-modality sample feature have a small difference and belong to the same description. For example, the first cross-modality sample feature and the second cross-modality sample feature are both video, audio, and text descriptions of the same movie content. On the contrary, if the KL divergence between the two is large, it indicates that the first cross-modality sample feature and the second cross-modality sample feature have a large difference and belong to different descriptions. For example, the first cross-modality sample feature and the second cross-modality sample feature are both video, audio, and text descriptions of very different movie contents.

If the KL divergence between the first cross-modality sample feature and the second cross-modality sample feature is higher than a predetermined threshold, which indicates that further training of the cross-modality encoder and tuning of the parameters in the cross-modality encoder is required, the training and tuning of the cross-modality encoder is continued. On the contrary, if the KL divergence between the first cross-modality sample feature and the second cross-modality sample feature is below the predetermined threshold, which indicates that the cross-modality encoder has met needs of the user or usage scenario, then the training and tuning of the cross-modality encoder may be stopped.

Additionally or alternatively, the training and tuning of the cross-modality encoder may include optimizing the model parameters using gradient descent methods, for example, continuously updating the model parameters along the negative gradient direction of the objective function until a minimum value or convergence is reached, including but not limited to batch gradient descent methods, random gradient descent methods, small batch gradient descent methods, and so on. As an example, the predetermined threshold in the present disclosure may be set according to needs of the user or needs of the usage scenario, which is not limited in the present disclosure in any way.

Figure 3:
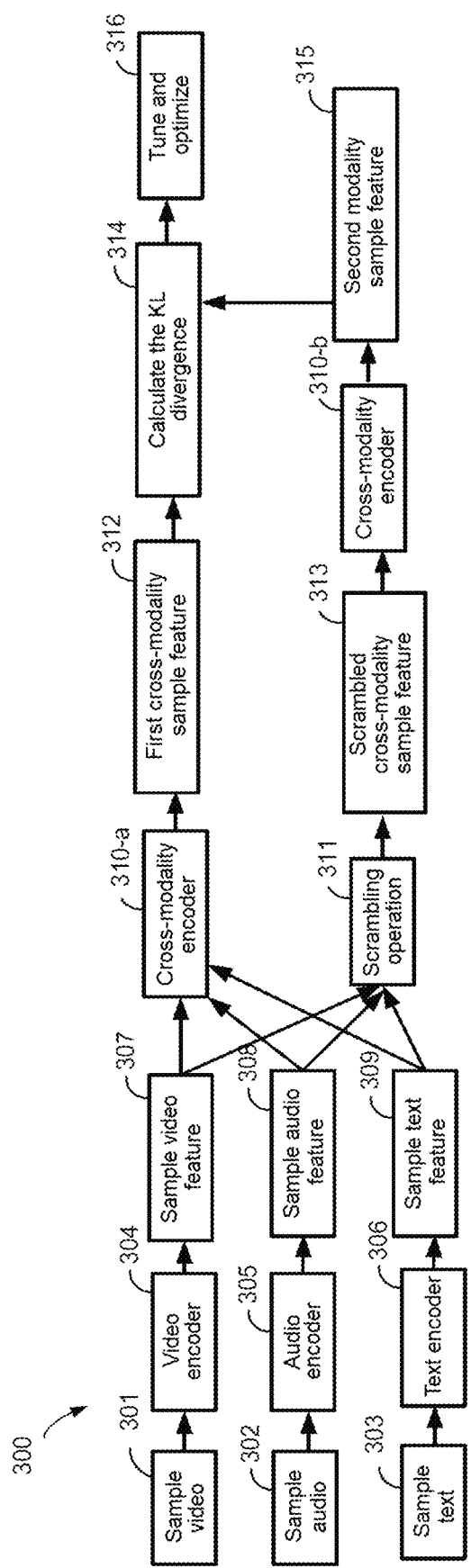
FIG. 3 illustrates a schematic diagram for generating a cross-modality encoder according to embodiments of the present disclosure.

FIG. 3 illustrates a schematic diagram for generating a cross-modality encoder 300 according to embodiments of the present disclosure. As shown in FIG. 3, a sample video 301, a sample audio 302, and a sample text 303 that correspond to the same content or are associated with the same content can be encoded by, for example, a video encoder 304, an audio encoder 305, and a text encoder 306, respectively, and features are extracted to obtain a sample video feature 307, a sample audio feature 308, and a sample text feature 309.

The extracted sample video feature 307, sample audio feature 308, and sample text feature 309 may be input to a cross-modality encoder 310-*a* implemented according to embodiments of the present disclosure for use in generating a first (original) cross-modality sample feature 312. The extracted sample video feature 307, sample audio feature 308, and sample text feature 309 may also be subjected to a scrambling operation 311 by a video-aided voice cloning system and eventually generate a scrambled cross-modality sample feature 313, wherein the scrambling operation 311 may include a random masking operation and an XOR operation.

The scrambled cross-modality sample feature 313 may be input to a cross-modality encoder 310-*b* for use in generating a second (scrambled) modality sample feature 315, wherein the various portions in the second modality sample feature 315 are not necessarily correlated with each other. Additionally or alternatively, in some embodiments, the cross-modality encoder 310-*a* and the cross-modality encoder 310-*b* may be one and the same encoder or different encoders, which is not limited in the present disclosure in any way.

The cross-modality encoder 310-*a* or the cross-modality encoder 310-*b* may then calculate 314 and compare the KL divergence between the first cross-modality sample feature 312 and the second modality sample feature 315. If the KL divergence between the two is higher than the predetermined threshold, which indicates that the current cross-modality encoder 310-a or cross-modality encoder 310-b has not yet met needs of the user or the usage scenario, various parameters and metrics in the cross-modality encoder still need to be tuned and optimized 316, and further training is required. If the KL divergence between the two is below the predetermined threshold, which indicates that the cross-modality encoder has met needs of the user or usage scenario, then the tuning and optimization 316 of the cross-modality encoder can be stopped.

Figure 4:
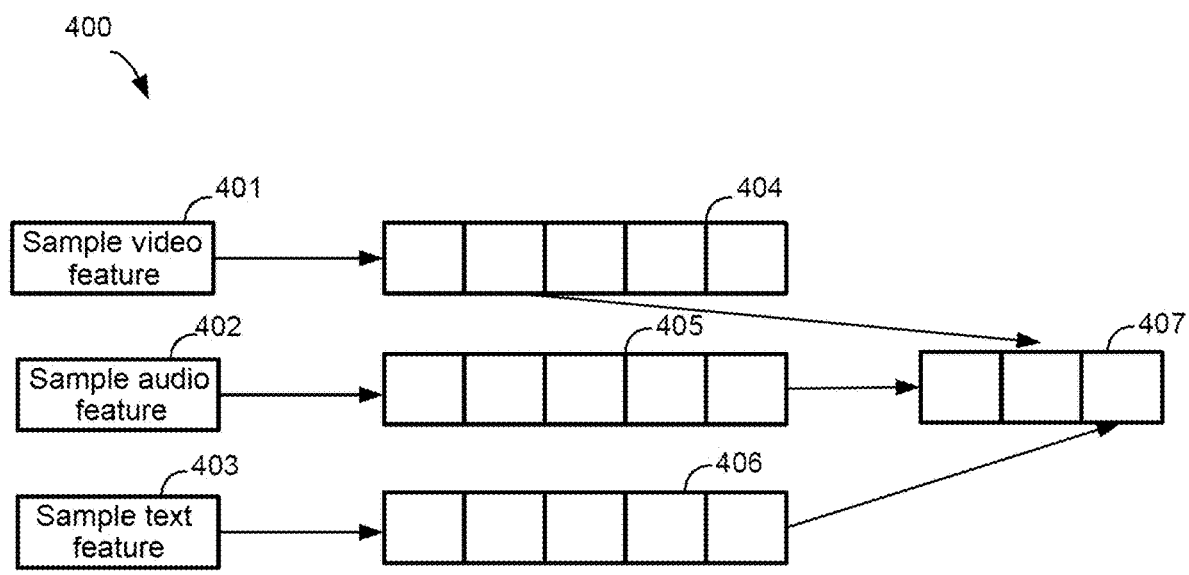
FIG. 4 illustrates a schematic diagram of performing an operation on sample feature data.

FIG. 4 illustrates a schematic diagram of performing an operation 400, illustratively an XOR operation, on sample feature data. As shown in FIG. 4, a sample video feature 401, a sample audio feature 402, and a sample text feature 403 extracted by unimodal encoders may be divided into a plurality of sample video feature portions 404, a plurality of sample audio feature portions 405, and a plurality of sample text feature portions 406 by a video-aided voice cloning system.

The video-aided voice cloning system may then perform random cross-concatenation or combination of any one or more of the plurality of sample video feature portions 404, the plurality of sample audio feature portions 405, and the plurality of sample text feature portions 406 to form a concatenated cross-modality sample feature. The concatenated cross-modality sample feature may also be processed by a random masking operation, and a scrambled cross-modality sample feature 407 is eventually generated. Through the XOR operation, features of different modalities can be fused into a common feature space, thus reducing the difference between modalities and avoiding information loss in conventional feature fusion methods.

Figure 5:
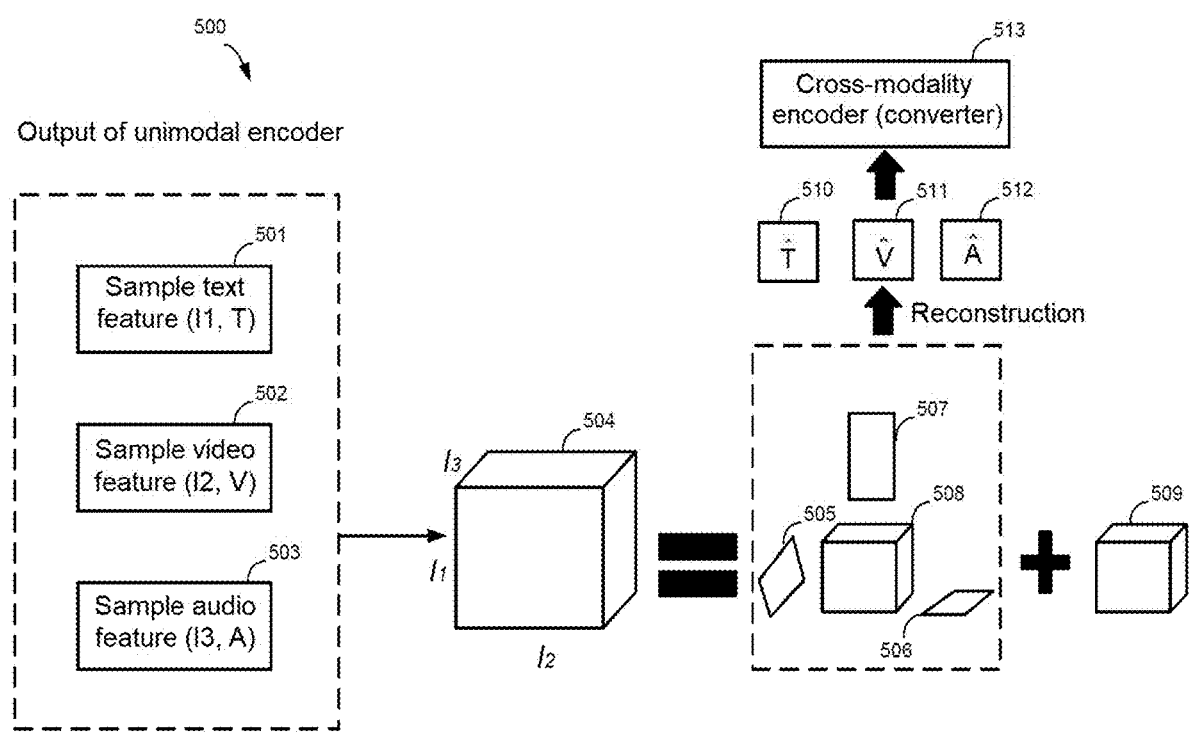
FIG. 5 illustrates a schematic diagram of another method for generating a cross-modality encoder according to embodiments of the present disclosure.

FIG. 5 illustrates a schematic diagram of another method 500 for generating a cross-modality encoder according to embodiments of the present disclosure. As shown in FIG. 5, a sample text feature (or embedding) T 501 for a text channel, a sample video feature (or embedding) V 502 for a video channel, and a sample audio feature (or embedding) A 503 for an audio channel from the outputs of unimodal encoders may be combined to form a link tensor X 504 for each channel (sample level modeling). The entries in this tensor are integers from 1 to 5. For example, if T 501, V 502, and A 503 are all linked together, the entry (1,1,1) would be 1.

The link tensor X 504 can then be decomposed using a CANDECOMP/PARAFAC (CP) decomposition into three vectors, i.e., a first vector $A^{(1)} \in \mathbb{R}^{I_1 \times J_1}$ 505, a second vector $A^{(2)} \in \mathbb{R}^{I_2 \times J_2}$ 506, and a third vector $A^{(3)} \in \mathbb{R}^{I_3 \times J_3}$ 507, where I and J are arbitrary predetermined hyperparameters, as well as a core matrix 508 and noise data 509. These three vectors 505, 506, and 507 contain denoised link information stored in the original link tensor X 504 and are primary vectors for text, audio, and video. The vectors 505, 506, and 507 have the rank of 1, have different orientations, and are orthogonal to each other. This CP decomposition process is considered as a transformation from the original space to the frequency space, which is one of the basic functions of CP decomposition.

The core matrix 508 is a three-dimensional tensor, which is formed by the exterior product of three factor matrices. A factor matrix is a matrix formed by merging vectors of the same dimension that make up a single-rank tensor. The noise data 509 can then be discarded, and the original unimodal encoder outputs can be reconstructed using the vectors 505, 506, and 507 and the core matrix 508. The ultimate reconstructed features $\hat{T}$ 510, $\hat{V}$ 511, and $\hat{A}$ 512 may contain denoised link information, which means that it is a good embedding space for the three modalities. Specifically, the optimization process may be expressed by the following equation:

$$\min_{\mu_A, \mu_T, \mu_V} \|\hat{A} - A\| + \|\hat{V} - V\| + \|\hat{T} - T\| \quad (8)$$

This process may be understood as minimizing the gap between the reconstructed features $\hat{T}$ 510, $\hat{V}$ 511, and $\hat{A}$ 512 and the sample features T, V, and A. Here, $\mu_A$, $\mu_T$, and $\mu_V$ are parameters of the three MLP (multi-layer perceptron) networks of which the outputs are the reconstructed embeddings, and $\hat{A} = A_{de} \mu_A$, where $A_{de}$ is the decomposed vector for the audio in the tensor decomposed parts. The other channels are then identical to the previous ones. In this process of reconstructing the features and thus pre-training the cross-modality encoder 513, an existing token-level modeling strategy is used, but a new tensor-based modality link modeling method is provided to replace the original modality-level modeling and sample-level modeling.

Figure 6:
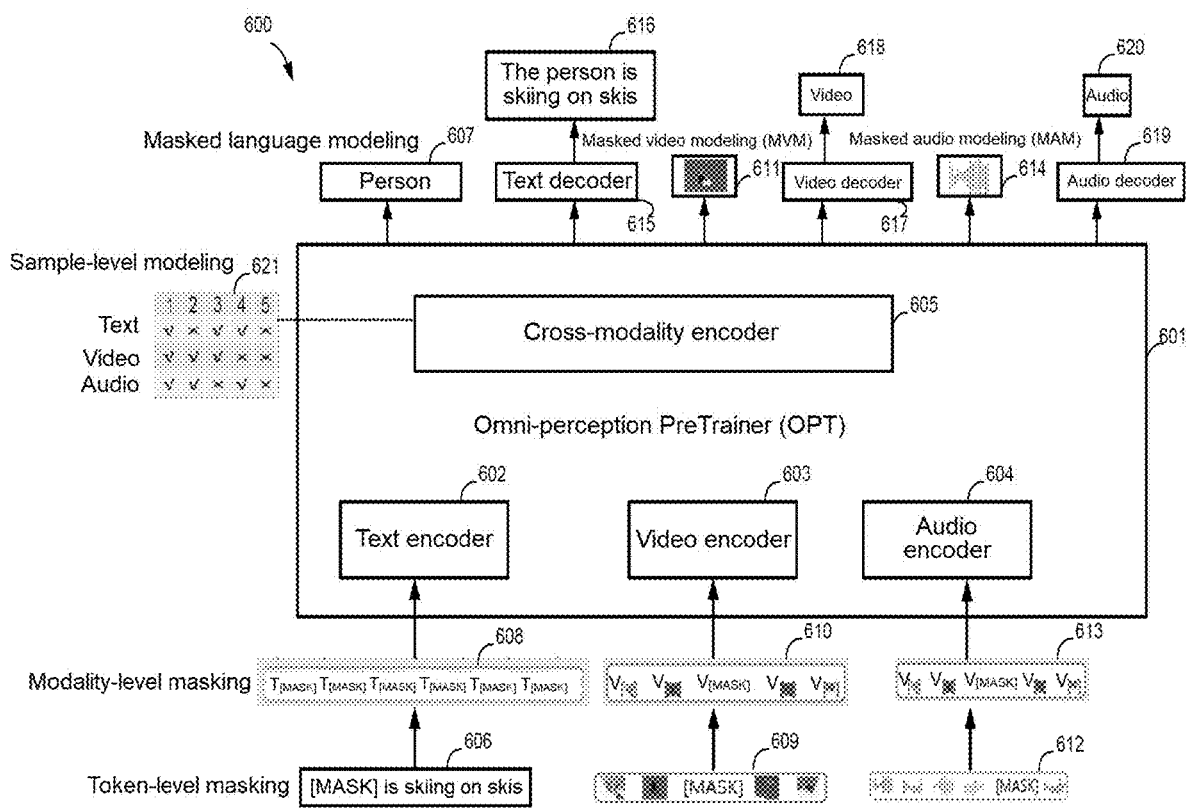
FIG. 6 illustrates a schematic diagram of a model architecture for cross-modality understanding using a cross-modality encoder according to embodiments of the present disclosure.

FIG. 6 illustrates a schematic diagram of a model architecture 600 for cross-modality understanding using a cross-modality encoder according to embodiments of the present disclosure.

In the previous techniques, the Omni-perception PreTrainer simply connects three unimodal encoders for three outputs and then inputs them into the cross-modality encoder to perform tasks. This process is completely implicit, and a lot of useful information is lost. The information loss and efficiency problems that occur in the previous techniques are remedied by the tensor-based method of the present disclosure.

As shown in FIG. 6, an Omni-perception PreTrainer (OPT) 601 may include unimodal encoders such as a text encoder 602, a video encoder 603, and an audio encoder 604, as well as a cross-modality encoder 605 that is trained according to the method of the present disclosure. The Omni-perception PreTrainer 601 uses the cross-modality encoder 605 network structure for machine learning (e.g., NLP) of multi-modality data, where a self-supervised target is generated by applying a mask mechanism on the perceptual modality. For example, for text data 606, a portion of the text can be masked, and then components such as the cross-modality encoder 605 can be trained to predict masked language modeling 607.

For audio and video data, similar self-supervised learning strategies can also be applied. For example, for video data 609, a portion of the video can be masked, and then components such as the cross-modality encoder 605 can be trained to predict masked video modeling 611. For example, for audio data 612, a portion of the audio can be masked, and then components such as the cross-modality encoder 605 can be trained to predict masked audio modeling 614.

The associated decoder can then generate the corresponding data based on the predicted modality modeling. For example, a text encoder 615 can generate based on the masked language modeling 607 a complete sentence 616 "The person is skiing on skis." A video decoder 617 can generate based on the masked video modeling 611 a complete video 618 of the person skiing on skis. An audio decoder 619 can generate based on the masked audio modeling 614 a corresponding complete audio 620 of the person being skiing on skis.

The Omni-perception PreTrainer 601 contains (1) token-level modeling, including the masked language modeling (MLM) 607, the masked video modeling (MVM) 611, and the masked audio modeling (MAM) 614; (2) modality-level modeling, including denoised text reconstruction 608, denoised video reconstruction 610, and denoised audio reconstruction 613; and (3) sample-level modeling 621, where "√" indicates that the corresponding modality is matched. A token-level mask mechanism is introduced in order for the token-level modeling, and a modality-level masking mechanism is introduced in order for the modality-level modeling and for the enabling of an arbitrary number of input modalities. In this way, the Omni-perception Pre-Trainer 601 can learn the correlation among multi-modality data and improve the capabilities of understanding and representing multi-modality data.

Figure 7:
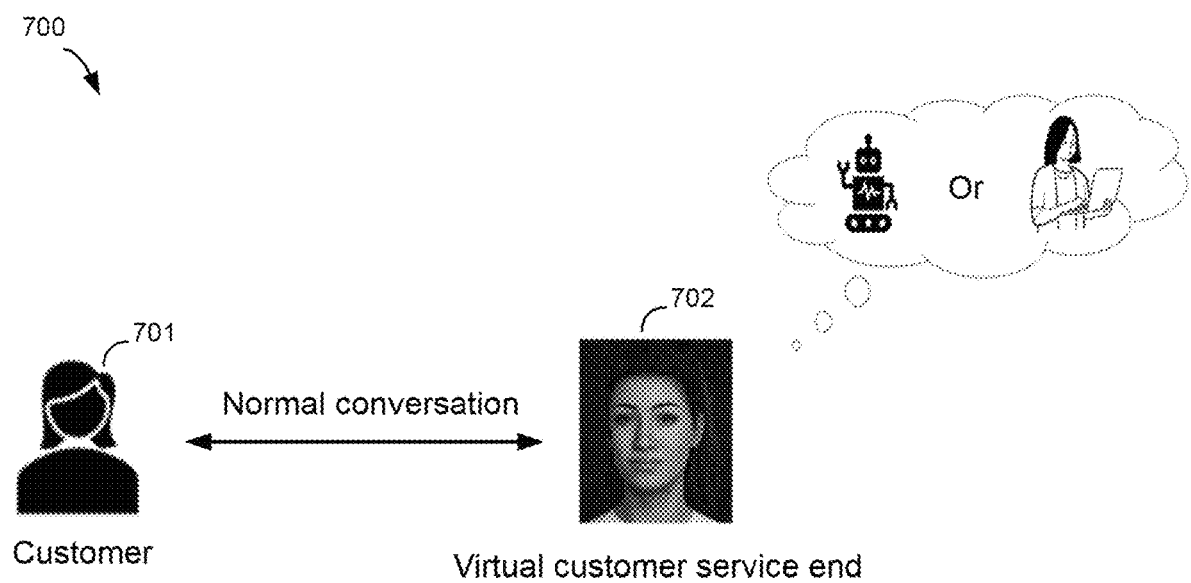
FIG. 7 illustrates a schematic diagram of providing a virtual customer service using a cross-modality encoder according to embodiments of the present disclosure.

FIG. 7 illustrates a schematic diagram of providing a virtual customer service 700 using a cross-modality encoder according to embodiments of the present disclosure. In a customer service system of an information service provider, a customer 701 may submit a voice service request to the customer service for use in requesting a tracking and resolution module for problems encountered while using the information system. The customer 701 often prefers human services to computer-provided intelligent services; however, human services are often costly and time-consuming.

Therefore, a virtual customer service end 702 that can use the video-aided voice cloning system based on embodiments of the present disclosure can clone and generate the voice of a human customer service agent. For example, the cross-modality encoder implemented according to the present disclosure can capture the human voice more clearly and clone and generate the original human customer service agent's voice as much as possible according to the captured sound data, as well as the human customer service agent's sentiments and expressions, and other data.

Thus, when the human customer service agent is busy or encounters a problem that cannot be solved at the moment, the human customer service agent can seamlessly switch to the virtual customer service end 702, allowing the customer experience of the customer 701 to be improved, which also provides productivity and cost savings.

Figure 8:
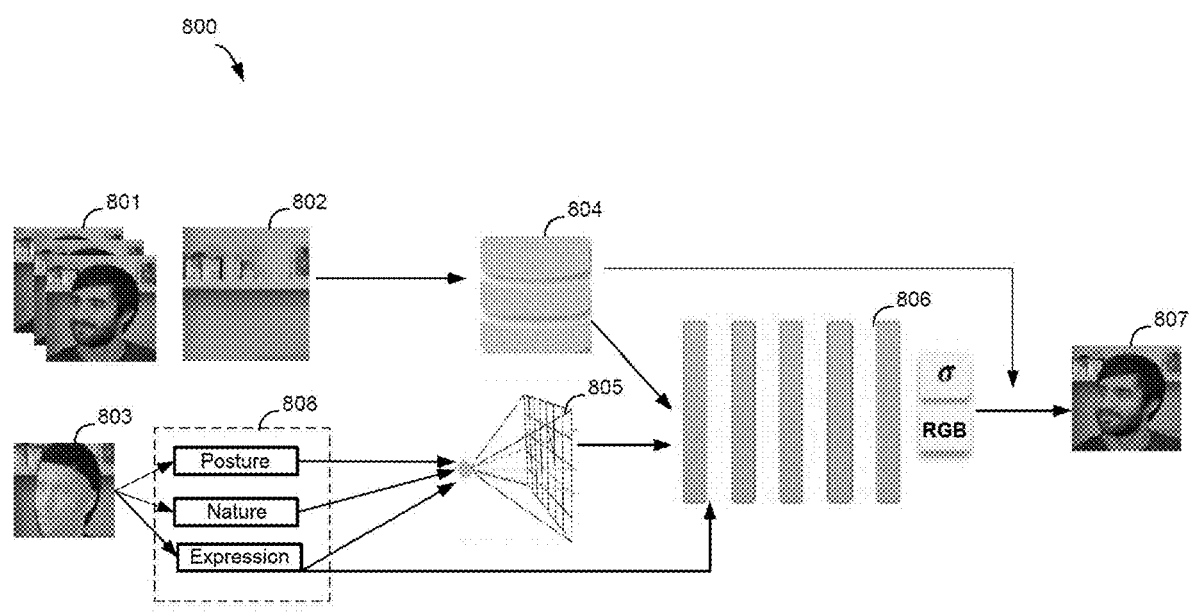
FIG. 8 illustrates a schematic diagram of a virtual image reconstruction process associated with a cross-modality encoder according to embodiments of the present disclosure.

FIG. 8 illustrates a schematic diagram of a virtual image reconstruction process 800 associated with a cross-modality encoder according to embodiments of the present disclosure. As shown in FIG. 8, the virtual image reconstruction process 800 may use as input a given portrait video 801 and an image 802 without a person (a background image). These data may be converted to learnable code 804. The dynamics of the face, i.e., facial expression 803, is captured using a face tracking method. Low-dimensional expression parameters 808 of the deformable model generated based on the facial expression are used as conditions for a neural scene representation network 806. The neural scene representation network 806 stores a dynamic neural radiance field 805 used during volume rendering. Data along the line of sight, such as the low-dimensional expression parameters 808, the learnable code 804, and the sampled data, can be input into the dynamic neural radiance field 805. Since the background is static, the color of the last sampled point of each ray can be set to a corresponding value of the background image. Eventually, a face image 807 is synthesized using volume rendering based on the estimated posture and expression.

However, a large amount of current research has shown that audio can also play an important role in expression capture, and text related to the reconstruction process can also contain information in expression reconstruction. Thus, in combination with the cross-modality encoder implemented according to the present disclosure, the face tracking and reconstruction process can be made more accurate by capturing more information from the real world.

Figure 9A:
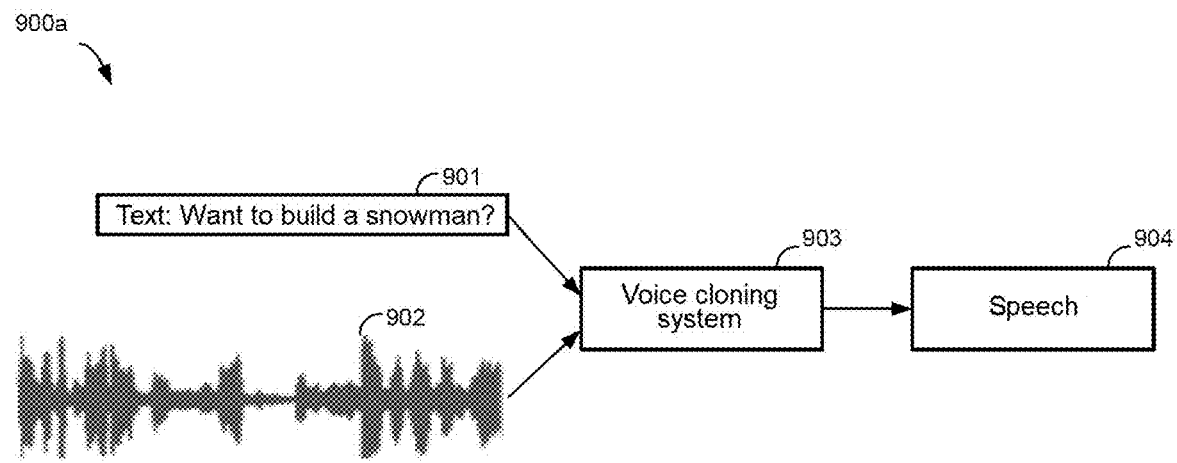
FIG. 9A illustrates a schematic diagram of a process of using generic voice cloning according to embodiments of the present disclosure.

FIG. 9A illustrates a schematic diagram of a process 900a of using generic voice cloning according to embodiments of the present disclosure. As shown in FIG. 9A, the content of a corresponding text 901 for the speech that is desired to be generated and the sound of a reference audio 902 are input to a voice cloning system 903 to generate a target speech 904.

The current voice cloning system 903 is based on neural text-to-speech (TTS) techniques, including WaveNet, Tacotron1, and Tacotron2, among others. Most of these models use autoregression to generate mel-spectrograms. Typically, these models only support solo speaker systems. As the demand for personalized speech generation increases, it is possible to model these TTSs and provide a feature learning and projection component to generate a variety of sounds for multiple speakers. The adaptability of TTS models to new speakers is currently being extensively studied. The current methods train models on large multi-speaker datasets and then fine-tune the entire model or only a part of the model. However, they typically achieve low adaptive performance for speakers never met before, especially when the reference speech length is short.

Figure 9B:
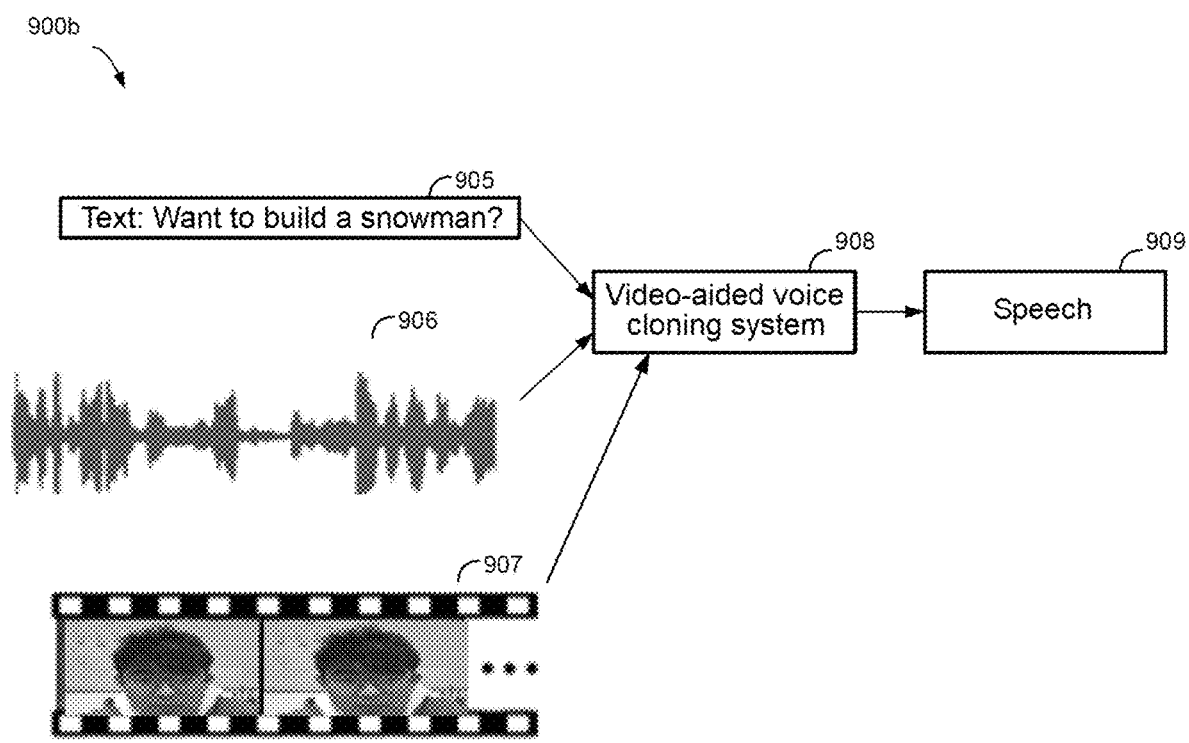
FIG. 9B illustrates a schematic diagram of a process of using video-aided voice cloning according to embodiments of the present disclosure.

FIG. 9B illustrates a schematic diagram of a process 900b of using video-aided voice cloning according to embodiments of the present disclosure. As shown in FIG. 9B, the content of a corresponding text 905 for the speech that is desired to be generated, the sound of a reference audio 906, and the expression of the character in a reference video 907 are input to a video-aided voice cloning system 908 to generate a target speech 909.

Given the input triplet $Z=\{Z_{text}, Z_{audio}, Z_{video}\}$ (i.e., subtitles/text, reference audio, and reference video), the video-aided voice cloning system 908 can generate the speech $y_{wave}$ 909 (i.e., the waveform in the time domain) from the text $Z_{text}$ 905, the speech 909 containing the sound of the reference audio 906 and the emotion of the reference video 907. The reference audio 906 may provide only the expected voice, and its content may be irrelevant.

In FIG. 9B, movie dubbing can be used as an example. Given a movie clip (i.e., the reference video 907), a subtitle (i.e., the text 905), and the reference audio 906, the video-aided voice cloning system 908 can synthesize the speech in the subtitle 909 according to the emotion of the character in the movie and the sound in the reference audio. With this method, it is possible to flexibly synthesize a speech having the learned features of the speaker and to improve the adaptive performance of the video-aided voice cloning system 908 for speakers that cannot be seen based on the improved linear projection.

Figure 10:
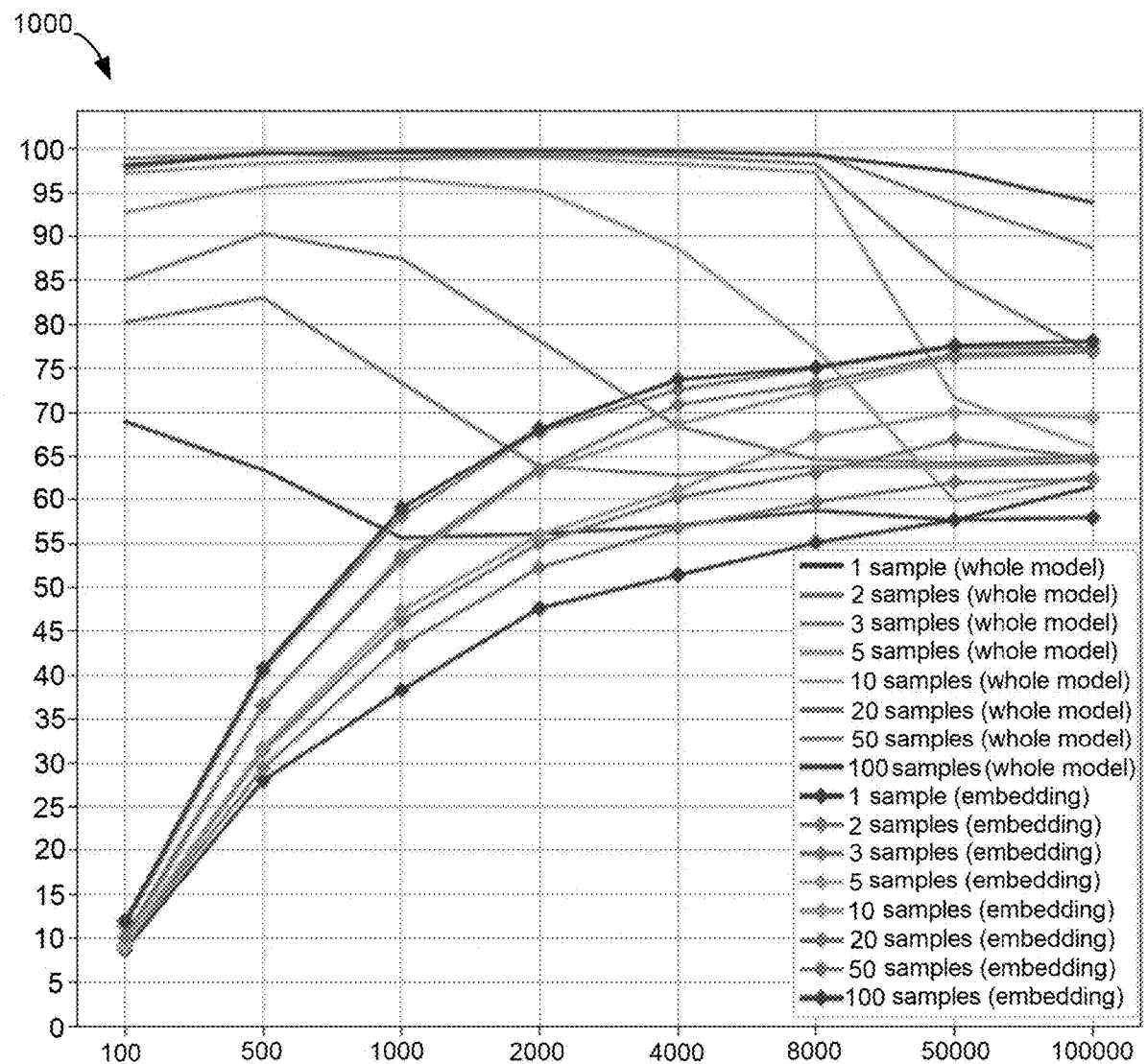
FIG. 10 illustrates a graph of experimental results of speaker classification using video-aided voice cloning according to embodiments of the present disclosure.

FIG. 10 illustrates a graph of experimental results 1000 of speaker classification using video-aided voice cloning according to embodiments of the present disclosure. The voice cloning experiment is performed on a VCTK dataset through a video-aided voice cloning system. The VCTK includes audio of native English speakers sampled at 48 KHz and including 108 different accents. As shown in FIG. 10, the vertical coordinate indicates the accuracy of speaker classification while the horizontal coordinate indicates the number of adaptive iterations of the video-aided voice cloning system, wherein "whole model" indicates the accuracy of speaker classification using the video-aided voice cloning system, and "embedding" indicates the accuracy of speaker classification using only the cross-modality encoder, the accuracy of speaker classification using the video-aided voice cloning system being significantly higher than the accuracy of speaker classification using the cross-modality encoder. It can be found that the accuracy of classification increases significantly with increase of the number of samples, where the number of samples can be up to 100. In the case of a small number of samples, tuning the speaker embedding (features) is less likely to over-fit the samples than tuning the whole video-aided voice cloning system. These two methods also require a different number of iterations to converge. Compared to the adaptive iterations of the whole video-aided voice cloning system (which converges at about 1000 iterations even for 100 cloned audio samples), the embedding adaptation requires significantly more iterations to converge and therefore much longer cloning time.

Figure 11:
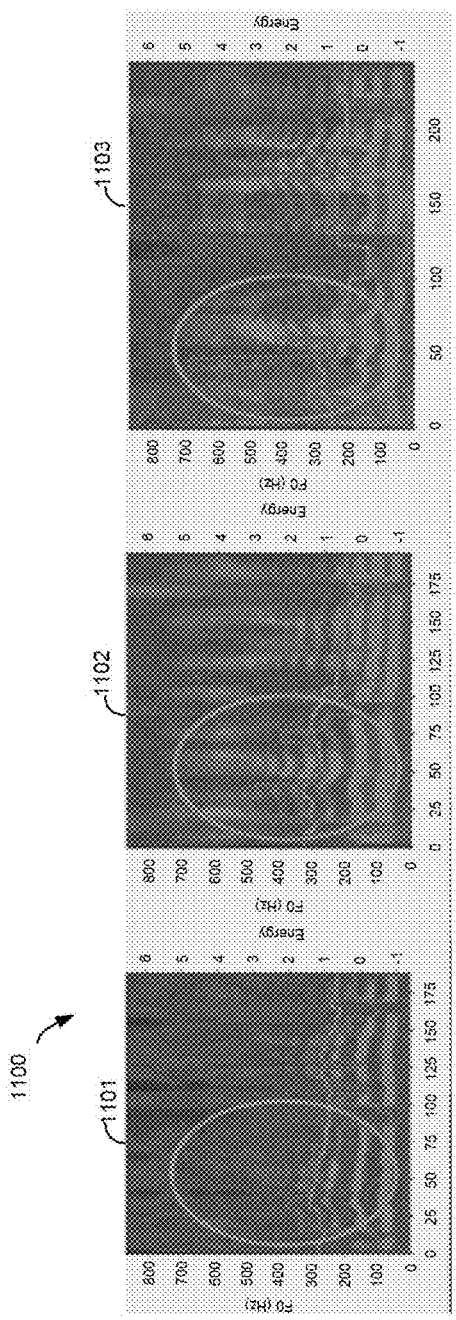
FIG. 11 illustrates a graph of experimental results of the quality of speeches generated using video-aided voice cloning according to embodiments of the present disclosure.

FIG. 11 illustrates a graph of experimental results 1100 of the quality of speeches generated using video-aided voice cloning according to embodiments of the present disclosure. The text of the experiment is "If they knew I knew, they would not have let him stay," the speaker is Tim, and the video sentiment is sad. Here, the curve graph 1101 represents the mel-spectrogram generated by FastSpeech2, the curve graph 1102 represents the mel-spectrogram generated by the implementation (V2C-Net) of the present disclosure, and the curve graph 1103 represents the ground truth mel-spectrogram. It can be seen that, compared with the curve graph 1101, the energy (volume) curve and the fundamental frequency curve (i.e., the F0 curve) of the mel-spectrogram represented by curve graph 1102 generated by the implementation of the present disclosure are both more similar to those of the ground truth mel-spectrogram. It is worth noting that, since the duration of the audio should also be predicted, the length of the generated audio may be different from that of the ground truth audio. The vertical coordinates indicate the audio contour and audio energy, and the horizontal axis is the duration of the audio. The circles in the graphs indicate the main differences.

Figure 12:
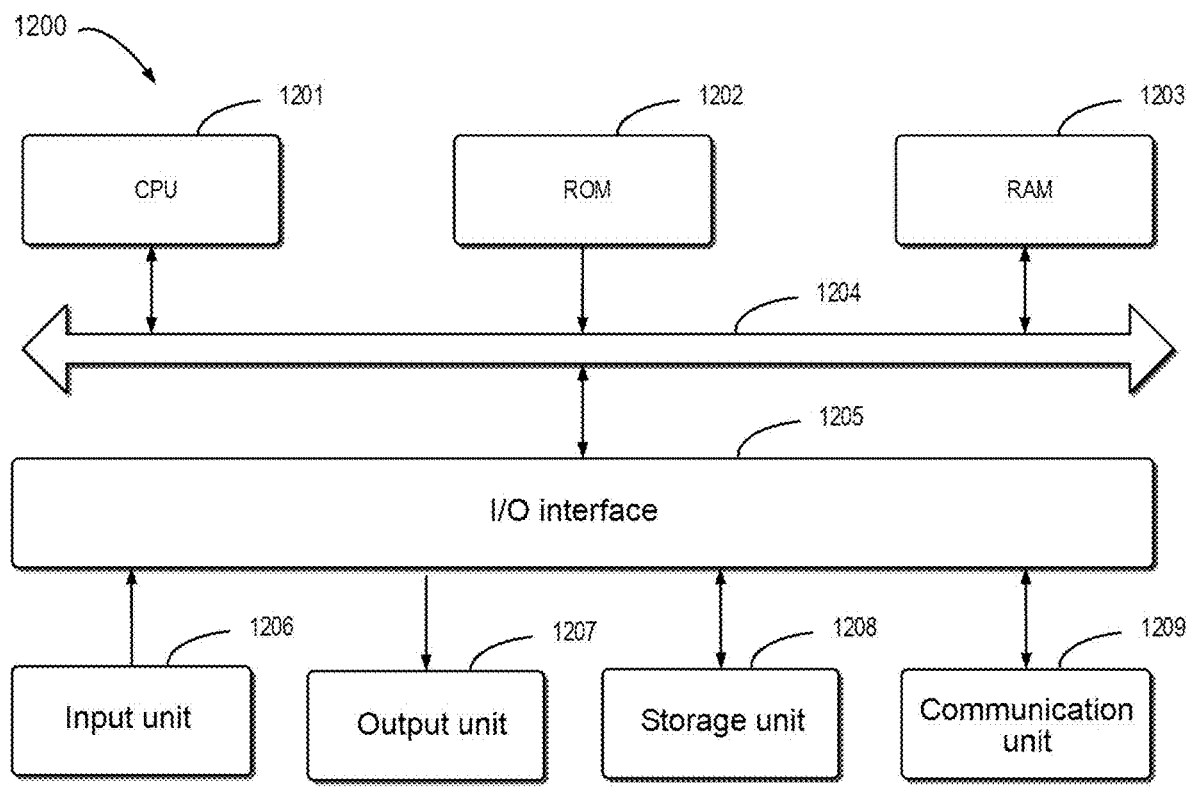
FIG. 12 illustrates a block diagram of an example device suitable for use in implementing embodiments of the present disclosure.

FIG. 12 illustrates a block diagram of an example device 1200 that can be used to implement embodiments of the present disclosure. The computing device in FIG. 1 may be implemented using the device 1200. As shown in the figure, the device 1200 includes a central processing unit (CPU) 1201 that may execute various appropriate actions and processing according to computer program instructions stored in a read-only memory (ROM) 1202 or computer program instructions loaded from a storage unit 1208 to a random access memory (RAM) 1203. Various programs and data required for the operation of the device 1200 may also be stored in the RAM 1203. The CPU 1201, the ROM 1202, and the RAM 1203 are connected to each other through a bus 1204. An input/output (I/O) interface 1205 is also connected to the bus 1204.

A plurality of components in the device 1200 are connected to the I/O interface 1205, including: an input unit 1206, such as a keyboard and a mouse; an output unit 1207, such as various types of displays and speakers; a storage unit 1208, such as a magnetic disk and an optical disc; and a communication unit 1209, such as a network card, a modem, and a wireless communication transceiver. The communication unit 1209 allows the device 1200 to exchange information/data with other devices via a computer network, such as the Internet, and/or various telecommunication networks.

The various processes and processing procedures described above, such as the process 200, may be performed by the CPU 1201. For example, in some embodiments, the process 200 may be implemented as a computer software program that is tangibly included in a machine-readable medium, such as the storage unit 1208. In some embodiments, part of or all the computer program may be loaded and/or installed to the device 1200 via the ROM 1202 and/or the communication unit 1209. One or more actions of the process 200 described above may be performed when the computer program is loaded into the RAM 1203 and executed by the CPU 1201.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for generating a cross-modality encoder, comprising:
    extracting a sample video feature of a sample video, a sample audio feature of a sample audio, and a sample text feature of a sample text, wherein contents of the sample video, the sample audio, and the sample text are associated with each other;
    generating, by the cross-modality encoder, a first cross-modality sample feature by combining the sample video feature, the sample audio feature, and the sample text feature;
    generating a scrambled cross-modality sample feature by performing a scrambling operation on the sample video feature, the sample audio feature, and the sample text feature;
    generating, by the cross-modality encoder, a second cross-modality sample feature by encoding the scrambled cross-modality sample feature; and
    tuning the cross-modality encoder based on the first cross-modality sample feature and the second cross-modality sample feature.

2. The method according to claim 1, wherein generating the scrambled cross-modality sample feature by performing the scrambling operation on the sample video feature, the sample audio feature, and the sample text feature comprises:
    dividing one or more features of the sample video feature, the sample audio feature, and the sample text feature into a plurality of portions;
    performing random masking on at least one of the plurality of portions to generate a plurality of masked portions; and
    performing an XOR operation on the plurality of masked portions.

3. The method according to claim 2, wherein performing the XOR operation on the plurality of masked portions comprises:
    generating the scrambled cross-modality sample feature by performing random concatenation on the plurality of masked portions.

4. The method according to claim 1, wherein tuning the cross-modality encoder based on the first cross-modality sample feature and the second cross-modality sample feature comprises:
    comparing the first cross-modality sample feature with the second cross-modality sample feature;

training the cross-modality encoder by tuning parameters in the cross-modality encoder in response to a Kullback-Leibler (KL) divergence between the first cross-modality sample feature and the second cross-modality sample feature being above a predetermined threshold; and stopping tuning the parameters in the cross-modality encoder in response to the KL divergence between the first cross-modality sample feature and the second cross-modality sample feature being below the predetermined threshold.

5. The method according to claim 1, wherein the cross-modality encoder is further tuned based on a reconstructed sample video feature, a reconstructed sample audio feature, and a reconstructed sample text feature.

6. The method according to claim 5, wherein reconstructing the sample video feature, the sample audio feature, and the sample text feature comprises:

combining the sample video feature, the sample audio feature, and the sample text feature into a tensor;

decomposing the tensor into three vectors using a CANDECOMP/PARAFAC (CP) decomposition, the three vectors being orthogonal to each other; and reconstructing the sample video feature, the sample audio feature, and the sample text feature based on the three vectors.

7. The method according to claim 1, further comprising using the cross-modality encoder for:

receiving a reference video, a reference audio, and a text;

generating a first set of cross-modality data by encoding the reference video, the reference audio, and the text;

predicting a duration of a speech based on each phoneme feature in the first set of cross-modality data;

predicting a pitch spectrum of the speech by converting pitch features in the first set of cross-modality data into a pitch spectrum;

predicting an energy value of the speech by calculating volume features and prosody features in the first set of cross-modality data;

generating a second set of cross-modality data based on the duration, the pitch spectrum, and the energy value;

decoding the second set of cross-modality data to generate a mel-spectrogram; and generating the speech associated with the text based on the mel-spectrogram.

8. The method according to claim 7, wherein generating the speech based on the mel-spectrogram comprises:

generating sampled data by performing a transposed convolution of the mel-spectrogram to sample the mel-spectrogram; and generating the speech by performing multi-receptive field fusion on the mel-spectrogram.

9. The method according to claim 7, further comprising:

predicting the duration of the speech by a duration predictor based on each phoneme feature in the first set of cross-modality data;

tuning the duration predictor by comparing the difference between the predicted duration and a ground truth phoneme duration;

predicting, by a pitch predictor, a pitch spectrum of the speech by converting pitch features in the first set of cross-modality data into a pitch spectrum;

tuning the pitch predictor by comparing the difference between the predicted pitch spectrum and a ground truth pitch spectrum;

predicting, by an energy predictor, an energy value of the speech by calculating volume features and prosody features in the first set of cross-modality data; and tuning the energy predictor by comparing the difference between the predicted energy value and a ground truth energy value.

10. An electronic device, comprising:

at least one processor; and a memory coupled to the at least one processor and having instructions stored thereon, wherein the instructions, when executed by the at least one processor, cause the electronic device to perform actions comprising:

extracting a sample video feature of a sample video, a sample audio feature of a sample audio, and a sample text feature of a sample text, wherein contents of the sample video, the sample audio, and the sample text are associated with each other;

generating, by a cross-modality encoder, a first cross-modality sample feature by combining the sample video feature, the sample audio feature, and the sample text feature;

generating a scrambled cross-modality sample feature by performing a scrambling operation on the sample video feature, the sample audio feature, and the sample text feature;

generating, by the cross-modality encoder, a second cross-modality sample feature by encoding the scrambled cross-modality sample feature; and tuning the cross-modality encoder based on the first cross-modality sample feature and the second cross-modality sample feature.

11. The electronic device according to claim 10, wherein generating the scrambled cross-modality sample feature by performing the scrambling operation on the sample video feature, the sample audio feature, and the sample text feature comprises:

dividing one or more features of the sample video feature, the sample audio feature, and the sample text feature into a plurality of portions;

performing random masking on at least one of the plurality of portions to generate a plurality of masked portions; and performing an XOR operation on the plurality of masked portions.

12. The electronic device according to claim 11, wherein performing the XOR operation on the plurality of masked portions comprises:

generating the scrambled cross-modality sample feature by performing random concatenation on the plurality of masked portions.

13. The electronic device according to claim 10, wherein tuning the cross-modality encoder based on the first cross-modality sample feature and the second cross-modality sample feature comprises:

comparing the first cross-modality sample feature with the second cross-modality sample feature;

training the cross-modality encoder by tuning parameters in the cross-modality encoder in response to a Kullback-Leibler (KL) divergence between the first cross-modality sample feature and the second cross-modality sample feature being above a predetermined threshold; and stopping tuning the parameters in the cross-modality encoder in response to the KL divergence between the first cross-modality sample feature and the second cross-modality sample feature being below the predetermined threshold.

14. The electronic device according to claim 10, wherein the cross-modality encoder is further tuned based on a reconstructed sample video feature, a reconstructed sample audio feature, and a reconstructed sample text feature.

15. The electronic device according to claim 14, wherein reconstructing the sample video feature, the sample audio feature, and the sample text feature comprises:
  combining the sample video feature, the sample audio feature, and the sample text feature into a tensor;
  decomposing the tensor into three vectors using a CAN-DECOMP/PARAFAC (CP) decomposition, the three vectors being orthogonal to each other; and
  reconstructing the sample video feature, the sample audio feature, and the sample text feature based on the three vectors.

16. The electronic device according to claim 10, further comprising using the cross-modality encoder for:
  receiving a reference video, a reference audio, and a text;
  generating a first set of cross-modality data by encoding the reference video, the reference audio, and the text;
  predicting a duration of a speech based on each phoneme feature in the first set of cross-modality data;
  predicting a pitch spectrum of the speech by converting pitch features in the first set of cross-modality data into a pitch spectrum;
  predicting an energy value of the speech by calculating volume features and prosody features in the first set of cross-modality data;
  generating a second set of cross-modality data based on the duration, the pitch spectrum, and the energy value;
  decoding the second set of cross-modality data to generate a mel-spectrogram; and
  generating the speech associated with the text based on the mel-spectrogram.

17. The electronic device according to claim 16, wherein generating the speech based on the mel-spectrogram comprises:
  generating sampled data by performing a transposed convolution of the mel-spectrogram to sample the mel-spectrogram; and
  generating the speech by performing multi-receptive field fusion on the mel-spectrogram.

18. The electronic device according to claim 16, further comprising:
  predicting the duration of the speech by a duration predictor based on each phoneme feature in the first set of cross-modality data;
  tuning the duration predictor by comparing the difference between the predicted duration and a ground truth phoneme duration;
  predicting, by a pitch predictor, a pitch spectrum of the speech by converting pitch features in the first set of cross-modality data into a pitch spectrum;
  tuning the pitch predictor by comparing the difference between the predicted pitch spectrum and a ground truth pitch spectrum;
  predicting, by an energy predictor, an energy value of the speech by calculating volume features and prosody features in the first set of cross-modality data; and
  tuning the energy predictor by comparing the difference between the predicted energy value and a ground truth energy value.

19. A computer program product that is tangibly stored on a non-transitory computer-readable storage medium and comprises machine-executable instructions, wherein the machine-executable instructions, when executed by a machine, cause the machine to perform:
  extracting a sample video feature of a sample video, a sample audio feature of a sample audio, and a sample text feature of a sample text, wherein contents of the sample video, the sample audio, and the sample text are associated with each other;
  generating, by a cross-modality encoder, a first cross-modality sample feature by combining the sample video feature, the sample audio feature, and the sample text feature;
  generating a scrambled cross-modality sample feature by performing a scrambling operation on the sample video feature, the sample audio feature, and the sample text feature;
  generating, by the cross-modality encoder, a second cross-modality sample feature by encoding the scrambled cross-modality sample feature; and
  tuning the cross-modality encoder based on the first cross-modality sample feature and the second cross-modality sample feature.

20. The computer program product according to claim 19, wherein generating the scrambled cross-modality sample feature by performing the scrambling operation on the sample video feature, the sample audio feature, and the sample text feature comprises:
  dividing one or more features of the sample video feature, the sample audio feature, and the sample text feature into a plurality of portions;
  performing random masking on at least one of the plurality of portions to generate a plurality of masked portions; and
  performing an XOR operation on the plurality of masked portions.

* * * * *